(12) United States Patent
Chandra et al.

(10) Patent No.: US 7,975,034 B1
(45) Date of Patent: Jul. 5, 2011

(54) SYSTEMS AND METHODS TO SECURE DATA AND HARDWARE THROUGH VIRTUALIZATION

(75) Inventors: Robin Chandra, N. Hollywood, CA (US); Artem Egoyan, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 190 days.

(21) Appl. No.: 12/262,369

(22) Filed: Oct. 31, 2008

(51) Int. Cl.
*G06F 15/177* (2006.01)

(52) U.S. Cl. ........ 709/222; 709/220; 709/221; 709/224; 711/163

(58) Field of Classification Search .................. 709/222, 709/203, 220, 221, 224, 227, 228; 711/163
See application file for complete search history.

(56) References Cited

U.S. PATENT DOCUMENTS

| | | | |
|---|---|---|---|
| 7,281,266 B2 * | 10/2007 | Goodman et al. | 726/16 |
| 2004/0111578 A1 * | 6/2004 | Goodman et al. | 711/163 |
| 2006/0146835 A1 * | 7/2006 | Homchaudhuri et al. | 370/395.53 |
| 2007/0143591 A1 * | 6/2007 | Dellacona | 713/2 |
| 2007/0174689 A1 * | 7/2007 | Chen | 714/13 |
| 2008/0183996 A1 * | 7/2008 | Field et al. | 711/163 |

OTHER PUBLICATIONS

Website: http.www.notebookreview.com/default.asp?newsID=3736, LoJack for Laptops Security Review, Feb. 2, 2009 (14 pgs.).
Website: http.www.absolute.com/computracecomplete/how-computracecomplete-works.asp, ComputraceComplete: How It Works, Feb. 2, 2009 (3 pgs.).
Website: http.www.absolute.com/products-patents.asp, Patents & Intellectual Property, Feb. 2, 2009 (2 pgs.).
Website: http.www.absolute.com/products-bios-enabled-computers.asp, Computrace Embedded Support in Bios, Feb. 2, 2009 (5 pgs.).

* cited by examiner

*Primary Examiner* — Barbara N Burgess
(74) *Attorney, Agent, or Firm* — Holland & Hart LLP (57) ABSTRACT

A method to secure data and hardware associated with a computing device is described. A request to initiate a secondary operating system is received. The secondary operating system may be partitioned from a primary operating system. In one embodiment, a reporting program may be executed on the secondary operating system and may also be isolated from the primary operating system. A determination may be made as to whether characteristics of the secondary operating system have been altered. The request to initiate the secondary operating system may be denied if characteristics of the secondary operating system have been altered. However, the secondary operating system may be initiated if characteristics of the secondary operating system have not been altered. In addition, the primary operating system may be initiated if characteristics of the secondary operating system have not been altered.

18 Claims, 8 Drawing Sheets

SYSTEMS AND METHODS TO SECURE DATA AND HARDWARE THROUGH VIRTUALIZATION

BACKGROUND

Computer systems have increasingly become an integral part of the business world and the activities of individual consumers. For example, computer systems are used to complete transactions, store data, provide information, etc. An operating system is the software component of a computer system that manages and coordinates processes executed by the system. In addition, the operating system manages and coordinates the various resources of the computer system. The operating system often is used to access sensitive data stored within the computer system.

Sensitive data may include financial data, such as credit card numbers, bank account numbers, and various other types of financial data. Sensitive data may also include personal information such as social security numbers, passwords, birthdays, and various other types of personal information. Computer systems may also contain other types of sensitive data, such as confidential intellectual property. Unauthorized access to confidential data may result in financial loss and other undesirable consequences.

If a computer system is stolen, the unauthorized user (i.e., the thief) may potentially gain access to the sensitive data stored within the computer system and the physical hardware (i.e., the computer system itself). Security programs may be installed on the computer system to communicate with an external server in the event that an unauthorized user gains access to the computer system. However, traditional security programs running on the operating system of the computer system may be easily located, circumvented, and disabled by the unauthorized user. What is needed, therefore, is a more robust mechanism to remediate against data and hardware theft.

SUMMARY

A method to secure data and hardware associated with a computing device is described. A request to initiate a secondary operating system is received. The secondary operating system may be partitioned from a primary operating system. In one embodiment, a reporting program may be executed on the secondary operating system and may also be isolated from the primary operating system. A determination may be made as to whether characteristics of the secondary operating system have been altered. The request to initiate the secondary operating system may be denied if characteristics of the secondary operating system have been altered. However, the secondary operating system may be initiated if characteristics of the secondary operating system have not been altered. In addition, the primary operating system may be initiated if characteristics of the secondary operating system have not been altered.

A connection with a server may be established using a virtualized network interface card (NIC). In one embodiment, one or more functions of the computing device may be disabled if a connection with the server is not established within a pre-determined period of time. Data associated with the identification of the computing device may be sent to the server. In addition, data associated with the activity of a user of the computing device may be sent to the server. In one embodiment, one or more security commands may be received by the reporting program from the server. The one or more security commands may be a command to terminate the initiation of the primary operating system.

In one embodiment, the method described above may be implemented by a software program running on the secondary operating system. In another embodiment, the method described above may be executed by a software program implemented on an integrated circuit.

A computer system that is configured to secure data and hardware associated with the computer system is also described. The computer system may include a processor configured to implement a primary operating system and a secondary operating system through virtualization. The computer system may also include a verification module implemented in a basic input/output system (BIOS) layer of the computer system. The verification module may also be implemented by the secondary operating system. In one embodiment, the verification module implements a verification process in the BIOS layer. If the verification process is successful in the BIOS layer, control of the verification module may be passed to the second operating system. A verification process may be implemented in the secondary operating system by the verification module. If the verification process is successful, the secondary operation system may be allowed to boot up. The secondary operating system may be partitioned from the primary operating system. In addition, the verification module may be configured to deny the request to initiate the secondary operating system if characteristics of the partition have been altered.

A computer-program product for securing data and hardware associated with a computing device is also described. The computer-program product includes a computer-readable medium having instructions thereon. The instructions include code programmed to receive a request to initiate a secondary operating system. The secondary operating system may be partitioned from a primary operating system. The instructions may also include code programmed to determine whether characteristics of the secondary operating system have been altered. The instructions may further include code programmed to deny the request to initiate the secondary operating system if characteristics of the secondary operating system have been altered.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
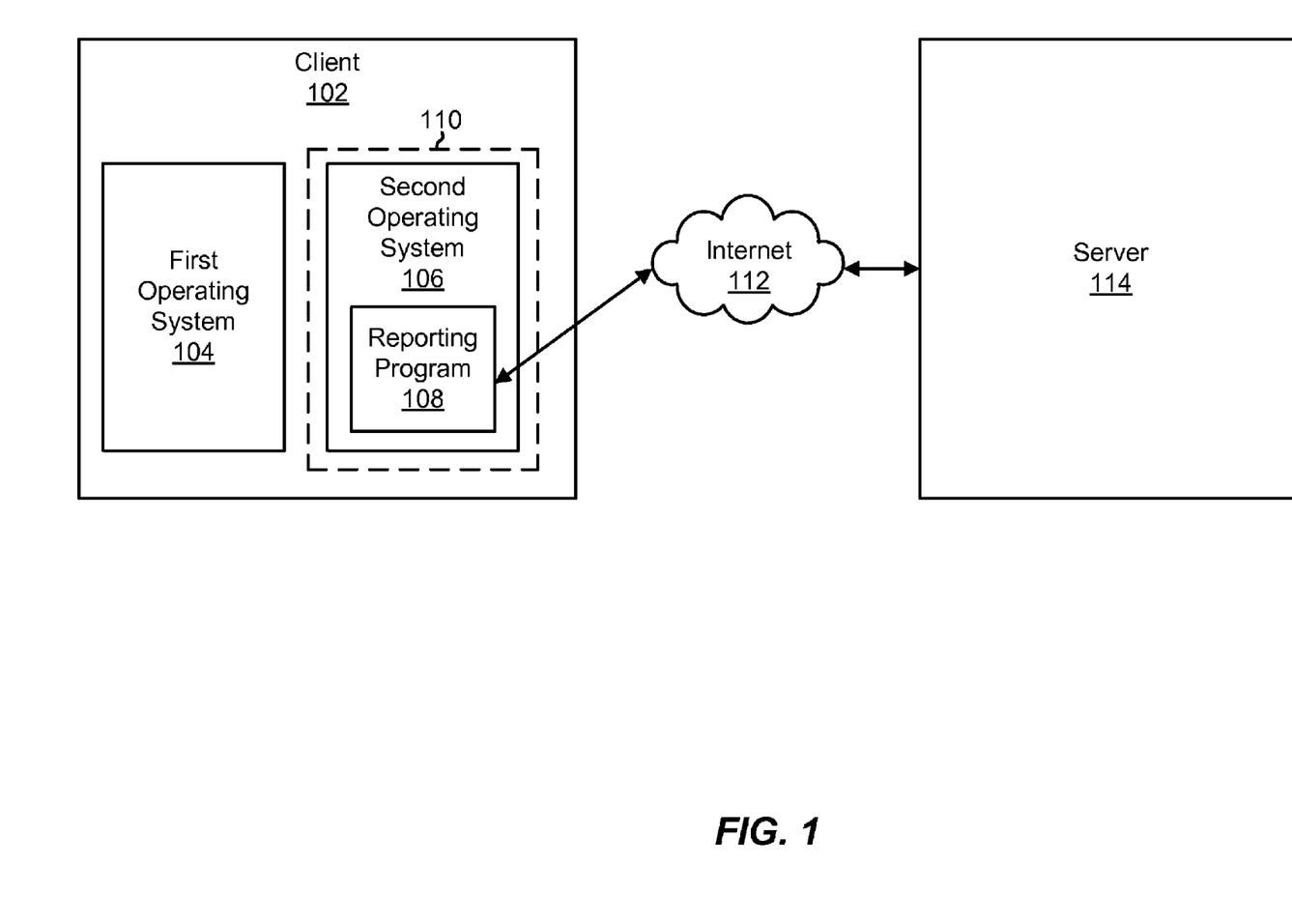
FIG. 1 is a block diagram illustrating one embodiment of a client communicating with a server.

FIG. 1 is a block diagram illustrating one embodiment of a client 102 communicating with a server 114. The client 102 and the server 114 may communicate over an internet connection 112. The connection between the client 102 and the server 114 may be a wireless connection, a wired connection, etc. The client 102 may be a computing device, such as a laptop, a personal digital assistant (PDA), handheld computer, desktop computer, super computer, or any other type of computing device.

In one embodiment, the client 102 includes a first operating system 104. The first operating system 104 may be a software component of the client 102 that is responsible for the management and coordination of activities and the sharing of the resources of the client 102. The first operating system 104 may act as a host for some of the applications that run on the client 102.

In one embodiment, the client 102 may implement virtualization technology. Virtualization may imply dividing the resources of the client 102 into multiple execution environments by applying hardware and software portioning, time-sharing, partial or complete machine simulation, emulation, quality of service, etc. In one configuration, virtualization technology is used to implement multiple operating systems on the client 102. For example, the client 102 may implement the first operating system 104 and a secondary operating system 106. The first operating system 104 and the second operating system 106 may be separated by a partition 110.

A reporting program 108 may run on the second operating system 106. In one embodiment, the reporting program 108 establishes communications with the server 114 over the internet 112. The reporting program 108 may transmit/receive information to/from the server 114. The reporting program 108 may be referred to as a phone-home program. In one embodiment, the reporting program 108 runs within the partition 110 on the second operating system 106. The reporting program 108 may be hidden and isolated from the first operating system 104. In other words, a task manager function, such as the Windows® Task Manager, that lists applications currently running on the first operating system 104 may not include the reporting program 108.

Figure 2:
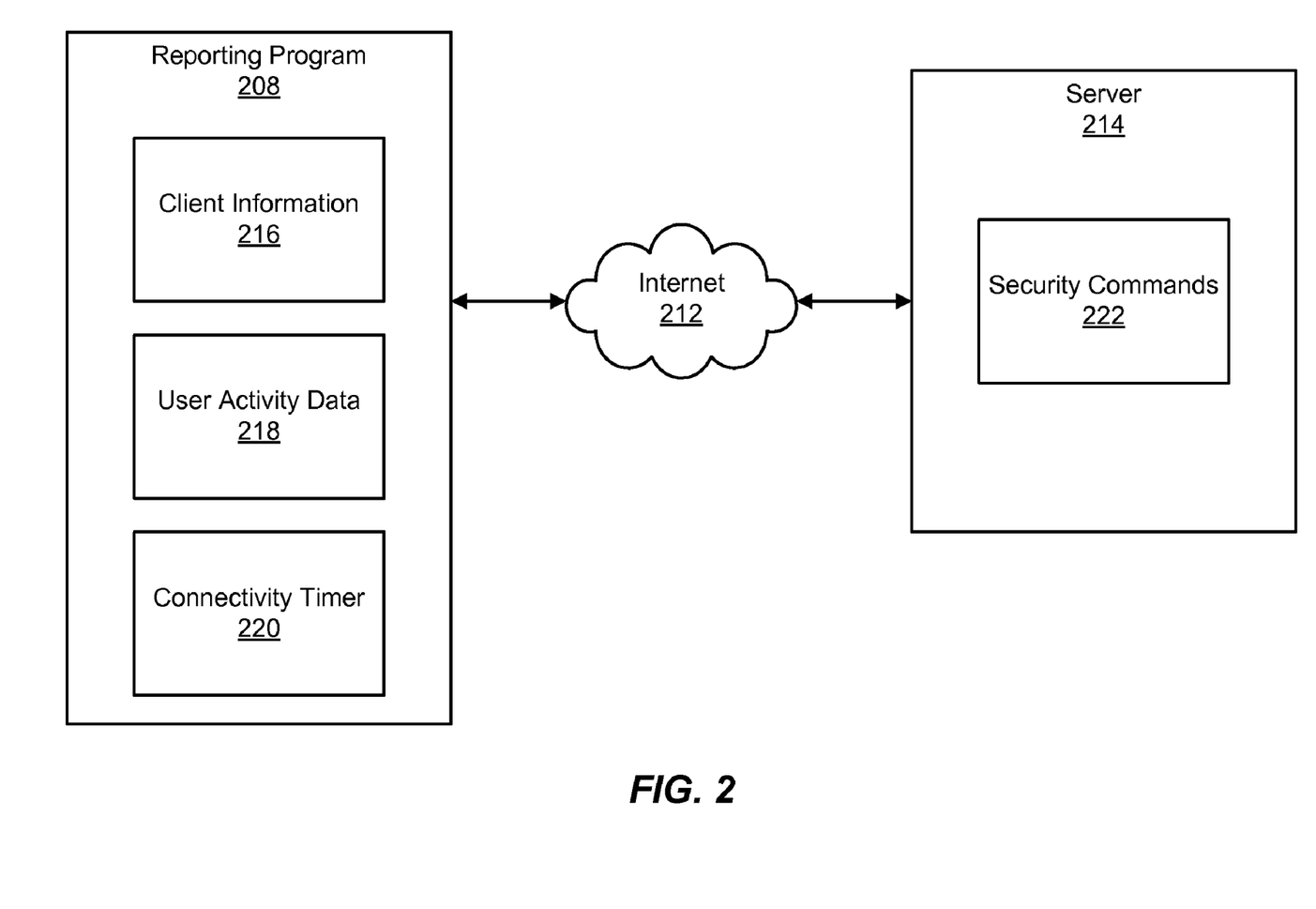
FIG. 2 is a block diagram illustrating one embodiment of a reporting program communicating with a server.

FIG. 2 is a block diagram illustrating one embodiment of a reporting program 208 communicating with a server 214. The reporting program 208 may be software implemented on a secondary operating system 106. In a further embodiment, the reporting program 208 may be software implemented on an integrated circuit. For example, the reporting program 208 may be implemented in a client 102 that implements active management technology (AMT) with vPro technology. AMT may be designed into a secondary processor on the client 102. In one embodiment, vPro technology is a combination of processor technologies, hardware enhancements, management features, and security technologies that may allow remote access to the client 102.

The communication between the reporting program 208 and the server 214 may take place over an internet connection 212. In one embodiment, the reporting program 208 transmits client information 216 and user activity data 218 to the server 214. The client information 216 may identify the client 102 on which the reporting program 208 is running. For example, the client information 216 may include a serial number, an internet protocol (IP) address, a media access control (MAC) address, etc. that is associated with the client 102. The server 214 may receive client information from multiple client computing devices. In one embodiment, the server 214 may manage the inventory of the multiple client computing devices using the client information received from the multiple devices.

The user activity data 218 may be information regarding the activity of a user that operates the client 102. For example, the user activity data 218 may be a log of programs or applications accessed by the user, a history of executed functions by the user, etc. The server 214 may receive user activity data from multiple client computing devices. In one embodiment, the server may maintain a record of user activity for each of the multiple client computing devices based upon the user activity data.

The reporting program 208 may also include a connectivity timer 220. In one embodiment, the connectivity timer 220 determines whether a connection to the server 214 has been established within a predetermined period of time. If a connection between the reporting program 208 and the server 214 is not established within the predetermined amount of time, the connectivity timer 220 indicates a timeout and the reporting program 208 may disable one or more functions of the client 102. For example, the client 102 may be located in an area that has no access to an internet connection 212. The reporting program 208 may not be able to establish a connection with the server 214 because of the inaccessibility to the internet 212. The connectivity timer 220 may expire after a certain amount of time if no connection is established between the reporting program 208 and the server 214.

If the connectivity timer 220 expires, the reporting program 208 may prevent the first operating system 104 and the second operating system 106 from booting up. If the first operating system 104 and the second operating system 106 have already booted up when the connectivity timer 220 expires, the reporting program 208 may lock down the first and/or second operating systems 104, 106 to prevent a user from accessing data stored in the client 102.

In one embodiment, the server 214 may transmit security commands 222 to the client 102 via the reporting program 208. The security commands 222 may instruct the reporting program 208 to disable one or more functions of the client 102. For example, the security commands 222 may instruct the reporting program 208 to lock down the client 102 so that data is inaccessible to a user. For example, a thief may steal the client 102. A user may notify the server 214 that the client 102 has been stolen. The server 214 may then transmit the security commands 222 to the client 102 via the reporting program 208 over the internet connection 212. Alternatively, a malicious program may be detected on the client 102. The server 214 may transmit the security commands 222 to disable the client 102 in order to prevent sensitive data from being accessed by the malicious program.

Figure 3:
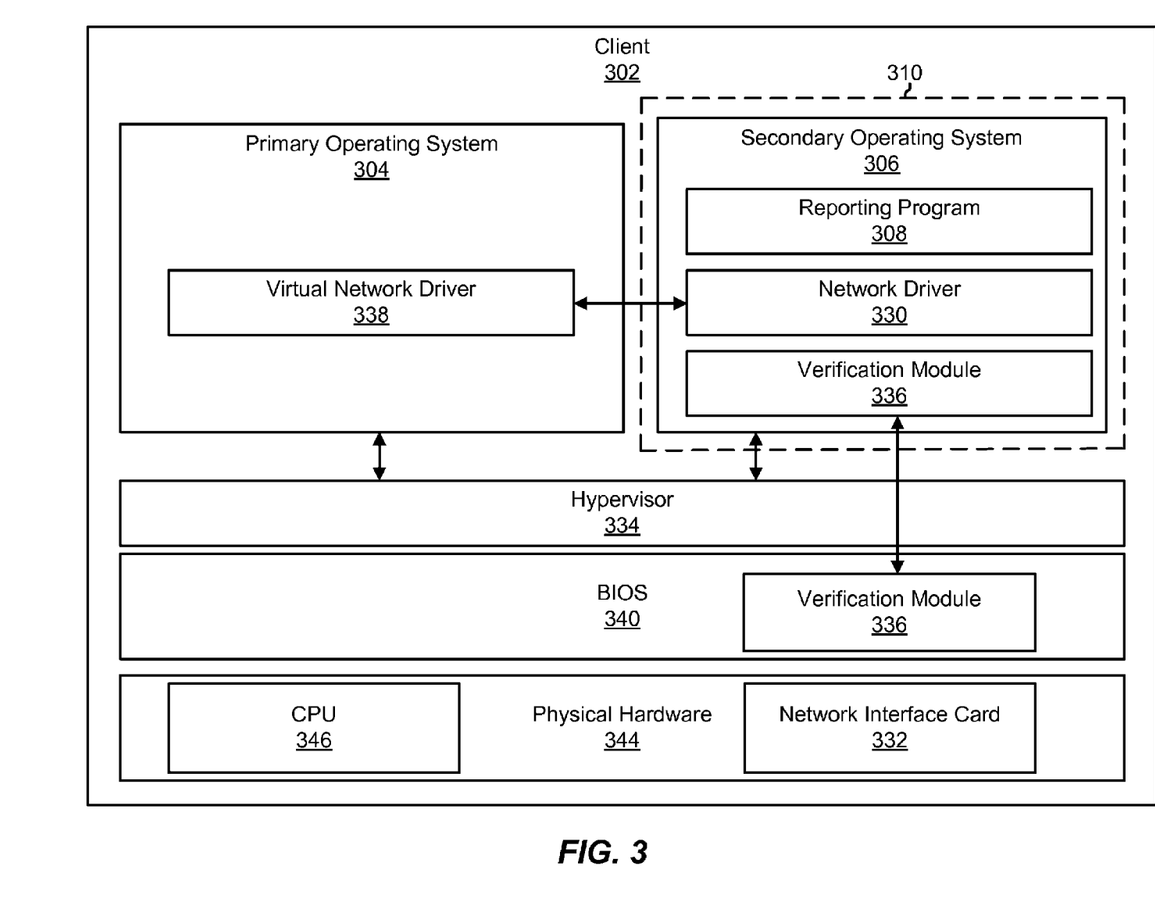
FIG. 3 is a block diagram illustrating a further embodiment of a client.

FIG. 3 is a block diagram illustrating a further embodiment of a client 302. As previously mentioned, the client 302 may include a partition 310 that separates a primary operating system 304 from a secondary operating system 306. The partition 310 may be referred to as a Service Operating System (SOS). In one embodiment, the SOS partition 310 isolates the secondary operating system 306 from the primary operating system 304. A user of the client 302 may access applications, programs, etc. through the primary operating system 304. In one embodiment, a reporting program 308 runs on the secondary operating system 306. Because the secondary operating system 306 (and the reporting program) are hidden and isolated from the primary operating system 304, the reporting program 308 may be inaccessible to a user of the client 302.

The client 302 may also include a network driver 330. A network interface card (NIC) 332 may be included on a physical hardware layer 344 of the client 302. The hardware layer 344 may also include a central processing unit (CPU) 346. The CPU 346 may include the ability to support virtualization. For example, in one embodiment, the primary operating system 304 may include a virtual network driver 338. Control of the NIC 332 may be given to the secondary operating system 306. The NIC 332 may be used to establish communications with a server 114 over an internet connection 112.

In one embodiment, the client 302 further includes a verification module 336. In one embodiment, the verification module 336 may be implemented by the secondary OS 306 and a basic input/output system (BIOS) layer 340 of the client 302. In one configuration, a verification process may be implemented by the verification module 336 in the BIOS layer 340. If the verification process is successful in the BIOS layer 340, control of the verification module 336 may be passed to the secondary OS 306. A verification process may then be implemented by the verification module 336 in the secondary OS 306. If the verification process is successful in the secondary OS 306 (explained below), the secondary OS 306 may be allowed to boot up.

The verification module 336 may be referred to as a verified boot mechanism. In one embodiment, the verification module 336 may verify the integrity of the SOS partition 310. For example, when the client 302 is powered on, the verification module 336 may verify whether or not the SOS partition 310 has been tampered with. In addition, the verification module 336 may verify whether the reporting program 308 has been tampered with. For example, the verification module 336 may verify whether or not a user has attempted to circumvent or disable the reporting program 308. In one embodiment, the verification module 336 may take hashes of the SOS partition 310 and/or the reporting program 308. These hash values may be stored in a non-volatile storage. In one embodiment, the hash values may also be encrypted. During a boot-up process, new hashes may be generated and compared to the stored hash values in order to verify the integrity of the SOS partition 310 and the integrity of the reporting program 308.

If the partition 310 has not been tampered with, the secondary operating system 306 may be booted up. For example, the client 302 may be powered up and the BIOS 340 process may begin. In one embodiment, the verification module 336 may verify the integrity of the secondary partition 310. If the integrity is verified, the secondary operating system 306 may boot up. The reporting program 308 may perform the activities and any additional integrity checks as previously described in FIG. 2. If the integrity checks are verified, the primary operating system 304 may also boot up. Booting up the primary operating system 304 after the secondary operating system 306 may allow the secondary operating system 306 to establish communications with a server 114 via the reporting program 308 before the primary operating system 304 boots up. Communicating with the server 114 before booting up the primary operating system 304 allows the reporting program 308 to receive security commands 222 (if any) from the server 114.

If the SOS partition 310 or the reporting program 308 have been tampered with, or if security commands 222 are received from the server 114, the booting up process for the primary operating system 304 and the secondary operating system 306 may be terminated. In other words, data stored in the client 302 may be inaccessible to a user. The termination of the booting up process may be executed by the BIOS 340 of the client 302. Once the BIOS 340 has halted the boot process, the primary operating system 304 may not be booted up unless a verified boot check in the BIOS 340 can be reset or disabled. In order to reset or disable the verified boot check, a password may be required.

The client 302 may also include a hypervisor 334. The hypervisor 334 may be a virtualization platform that allows multiple operating systems to run on the client 102 at the same time. For example, the hypervisor 334 may isolate the primary operating system 304 and the secondary operating system 306 from each other. Further, the hypervisor 334 may allocate processor resources, memory resources, peripheral component interconnect (PCI) devices, and execution time between the primary operating system 304 and the secondary operating system 306.

Figure 4:
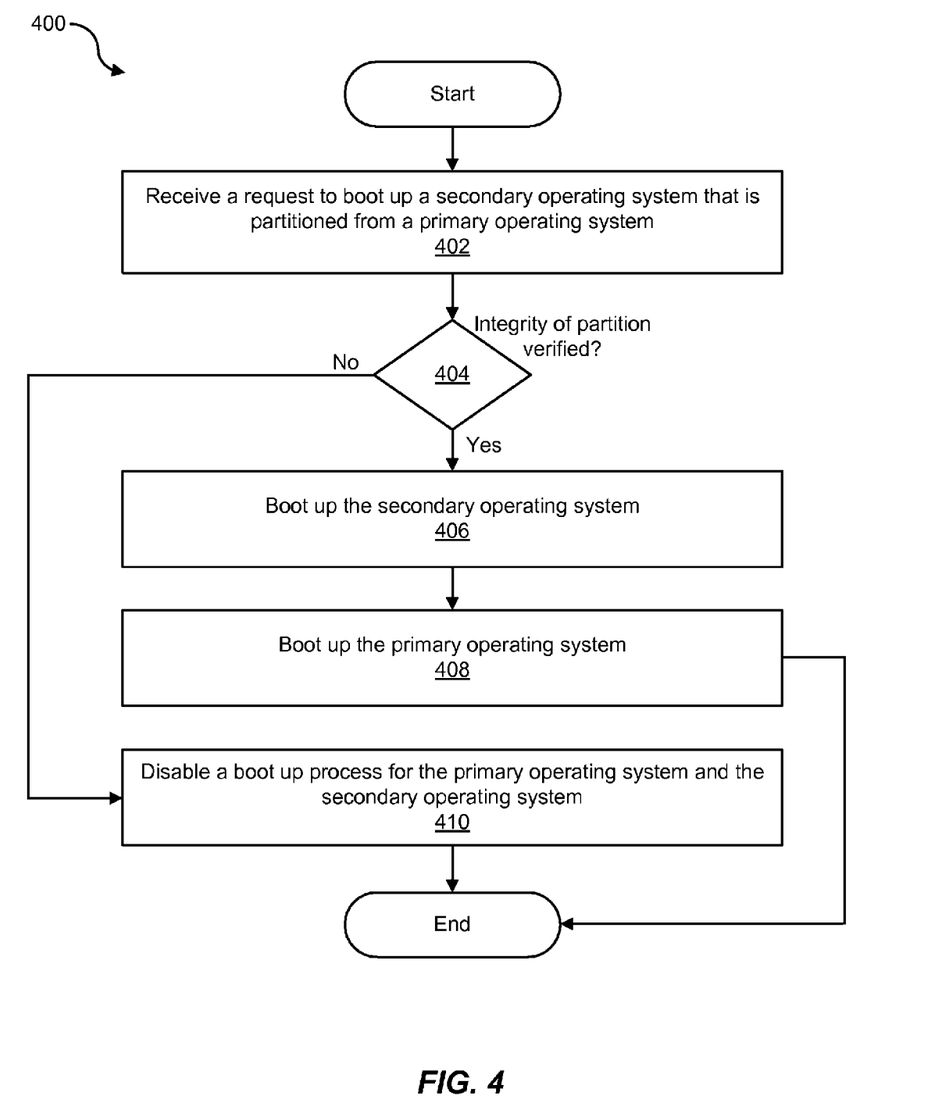
FIG. 4 is a flow diagram illustrating one embodiment of method to secure data in a client computing device.

FIG. 4 is a flow diagram illustrating one embodiment of method 400 to secure data in a client computing device. The method 400 may be implemented by the reporting program 108 and the verification module 336. As previously mentioned, the reporting program 108 and the verification module 336 may be implemented on a secondary operating system 106 which is hidden and isolated from a primary operating system 104.

In one embodiment, a request to boot up the secondary operating system is received 402. A determination 404 may be made as to whether the integrity of the partition is verified. For example, a determination 404 is made as to whether or not the partition 110 (including the reporting program 108) has been tampered with. If it is determined 404 that the integrity of the partition is verified (i.e., the partition has not been tampered with), the secondary operating system may be booted up 406. In addition, the primary operating system may be booted up 408 after the secondary operating system 106 has been booted up 406.

However, if it is determined 404 that the partition which includes the reporting program 108 is not verified (i.e., the partition has been tampered with), a boot up process for the primary operating system and the secondary operating system may be disabled 410. In other words, if it is determined that the integrity of the partition 110 is compromised, the primary operating system 104 and the secondary operating system 106 may not be booted up.

Figure 5:
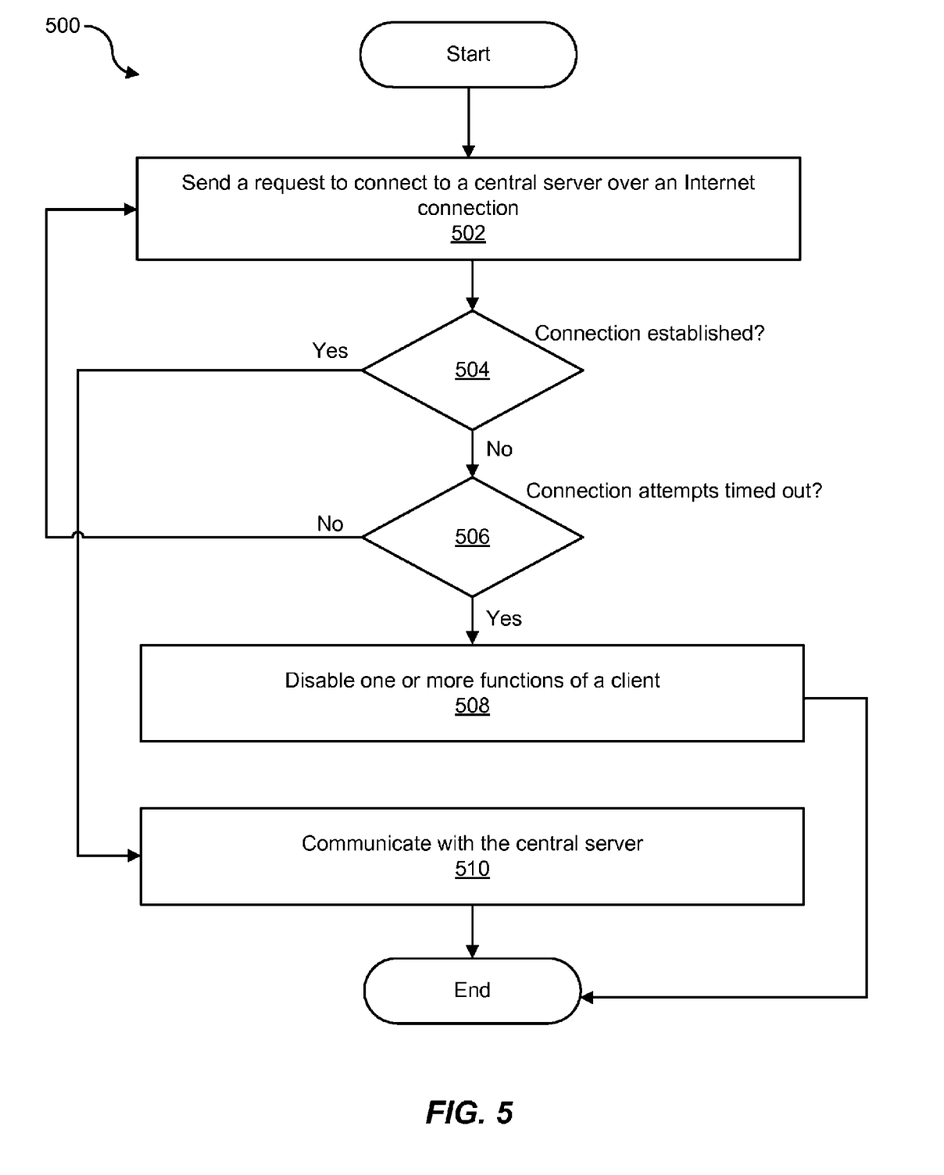
FIG. 5 is a flow diagram illustrating one embodiment of a method to determine if a connectivity timer has timed out.

FIG. 5 is a flow diagram illustrating one embodiment of a method 500 to determine if a connectivity timer 220 has timed out. The method 500 may be implemented by the reporting program 108. In one embodiment, a request to connect to a central server 114 over an internet connection may be sent 502. A determination 504 may be made as to whether or not a connection with the central server 114 is established. If it is determined 504 that a connection between the reporting program 108 and the central server 114 is established, the reporting program 108 may communicate 510 with the central server 114.

However, if it is determined 506 that a connection between the reporting program 108 and the central server 114 is not established, a determination 506 may be made as to whether or not a pre-determined amount of connection attempts have timed out. If the connection attempts have not timed out, the method 500 may return to send 502 a request from the reporting program 108 to the central server 114. However, if it is determined 506 that the connection attempts have timed out, one or more functions of a client computing device 102 may be disabled 508. For example, the reporting program 108 may determine 506 that a predetermined period of time has passed without the establishment of a connection to the central server 114. Upon the expiration of this time period, the reporting program 108 may disable 508 one or more functions of the client computing device 102. For example, the reporting program 108 may terminate a boot up process for the primary operating system 104 and/or the secondary operating system 106. In addition, the reporting program 108 may lock the client computing device, etc. The above-mentioned actions by the reporting program 108 may cause data stored in the client 102 to be inaccessible to a user.

Figure 6:
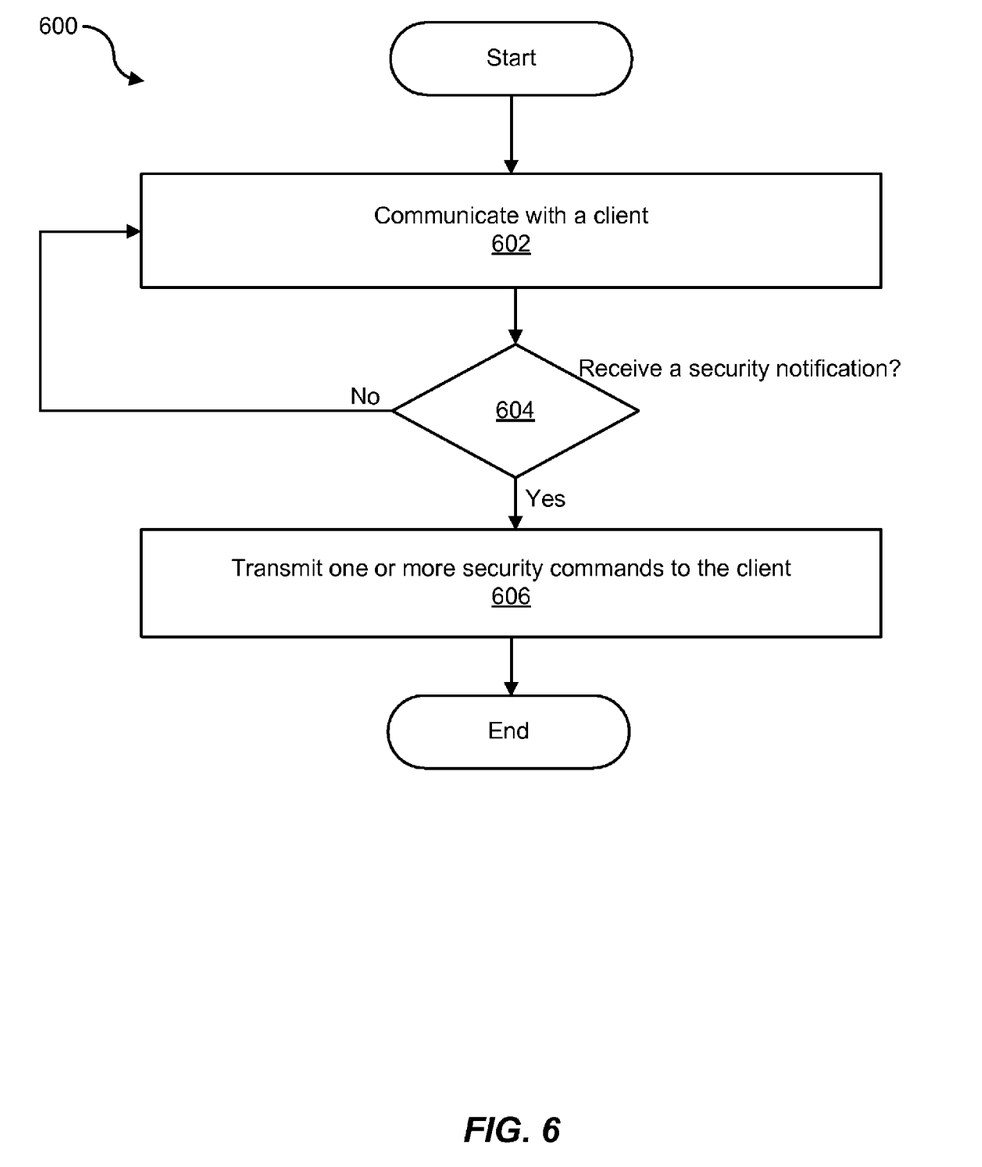
FIG. 6 is a flow diagram illustrating one embodiment of a method to communicate security commands to a client.

FIG. 6 is a flow diagram illustrating one embodiment of a method 600 to communicate security commands to a client 102. In one embodiment, the method 600 may be implemented by a server 114.

In one configuration, the server 114 may communicate 602 with a client 102. The server 114 and the client 102 may communicate 602 over an internet connection 112. A determination 604 may be made as to whether or not a security notification is received. If a security notification is not received, the server 114 and the client 102 may continue to communicate 602 with each other. However, if it is determined 604 that a security notification is received, one or more security commands may be transmitted 606 to the client 102. For example, the client 102 (such as a laptop) may be stolen before, during, or after communications with the server 114 have been established. The owner of the stolen laptop may notify the server 114 that the laptop has been stolen. The server 114 may then transmit 606 one or more security commands to the stolen laptop over an internet connection 112. The security commands may be received by the reporting program 108. In one embodiment, the security commands may instruct the reporting program to disable one or more functions of the client 102. For example, the security commands may instruct the reporting program 108 to lock features of the client 102, terminate one or more programs running on the client 102, etc. The actions taken by the reporting program 108, in response to the received security commands, render data and hardware of the client 102 inaccessible to a user that does not possess the passwords needed to unlock the features of the client 102.

Figure 7:
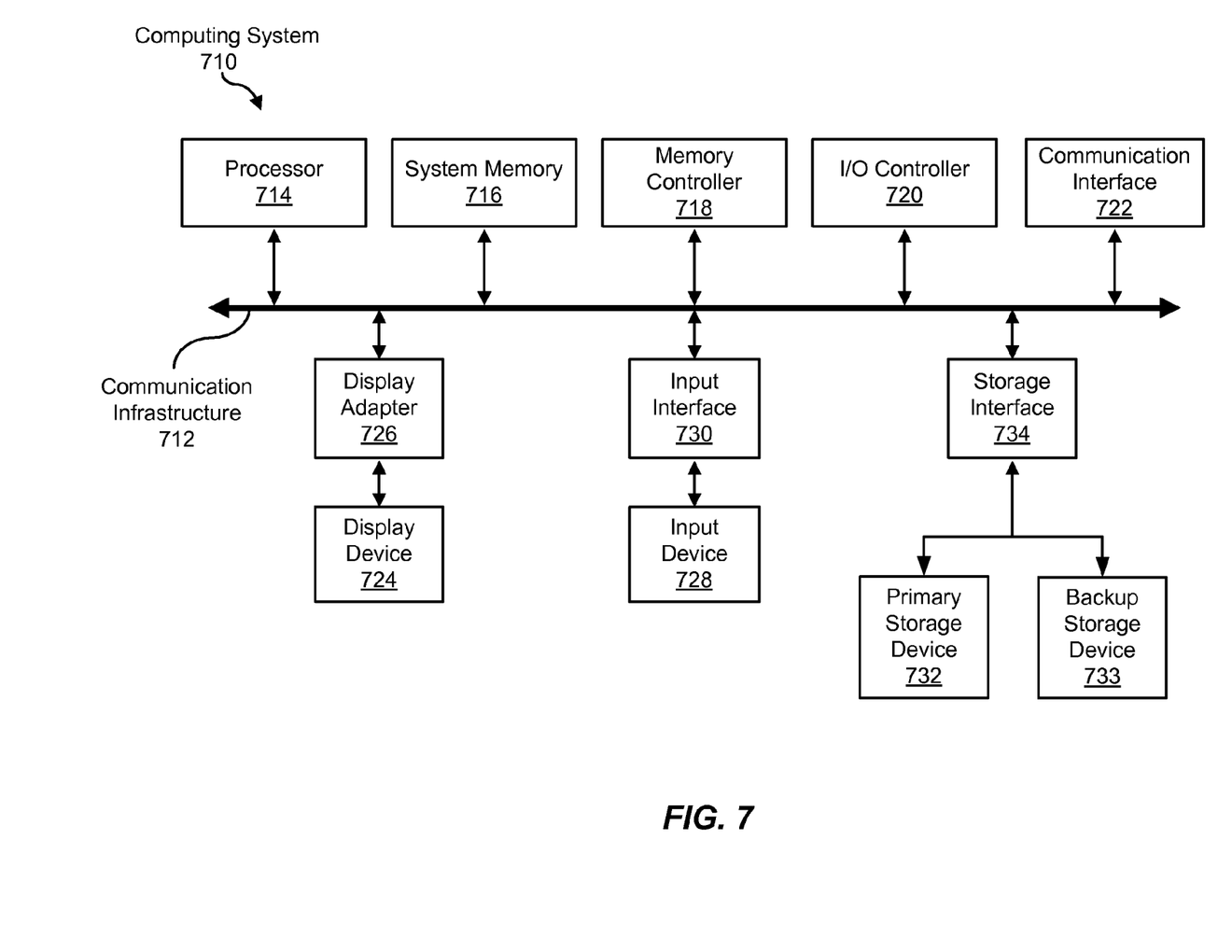
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, and denying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, determining, and denying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for receiving, determining, and denying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, and denying steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, and denying steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the receiving, determining, and denying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
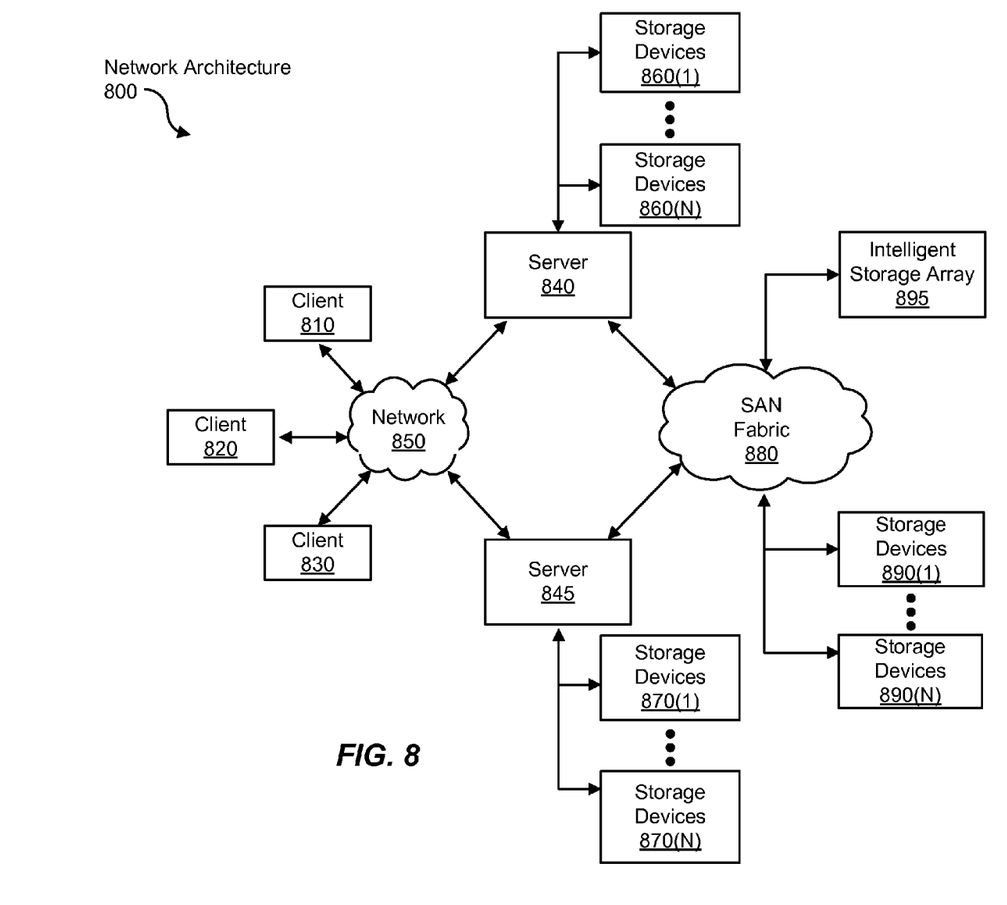
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, and denying steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for securing data and hardware associated with a computing device that may comprise: 1) receiving a request to initiate a secondary operating system, 2) determining whether characteristics of a partition between a primary operating system and the secondary operating system have been altered, and then 3) denying the request to initiate the secondary operating system if characteristics of the partition have been altered.

Computing system 710 and/or one or more of the components of network architecture 800 may also perform and/or be a means for securing data and hardware associated with a computing device by: 1) receiving a request to initiate a secondary operating system, 2) determining whether characteristics of a partition between a primary operating system and the secondary operating system have been altered, and then 3) denying the request to initiate the secondary operating system if characteristics of the partition have been altered.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to secure data and hardware associated with a computing device, the method comprising:

Executing, by a processor of the computing device a reporting program;

receiving, by the processor, a request to initiate a secondary operating system, wherein the secondary operating system isolated from a primary operating system by a partition;

Determining, by the processor, whether the partition isolating the secondary operating system has been altered;

upon determining that the partition isolating the secondary operating system has been altered, recording, by the reporting program, information regarding the altering of the partition to a remote server within a predetermined period of time defined by a connectivity timer, denying, by the processor, the request to initiate the secondary operating system and preventing the initiation of the primary operating system;

Determining, by the connectivity timer, whether a connection over a network has been established between the reporting program and the remote server within a predetermined period of time; and Upon determining that the connection over the network has not been established between the reporting program and the remote server within the predetermined period of time, disabling, by the processor, at least one function of the computing device.

2. The method of claim 1, further comprising initiating the secondary operating system if the partition isolating the secondary operating system has not been altered.

3. The method of claim 2, further comprising initiating the primary operating system if the partition isolating the secondary operating system has not been altered.

4. The method of claim 2, further comprising establishing a connection with a server using a virtualized network interface card (NIC).

5. The method of claim 4, further comprising sending data associated with the identification of the computing device to the server.

6. The method of claim 4, further comprising sending data associated with the activity of a user of the computing device to the server.

7. The method of claim 4, further comprising receiving one or more security commands from the server, wherein the one or more security commands comprise a command to terminate the initiation of the primary operating system.

8. The method of claim 1, wherein the method is implemented by a software program running on the secondary operating system.

9. The method of claim 1, wherein the method is executed by a software program implemented on an integrated circuit.

10. A computer system that is configured to secure data and hardware associated with a computing system, the computer system comprising:

A processor configured to implement a primary operating system and a secondary operating system through virtualization;

The processor configured to execute a reporting program;

A verification module implemented by the secondary operating system, the verification module being configured to:

receive a request to initiate a secondary operating system, wherein the secondary operating system isolated from a primary operating system by a partition;

determine whether the partition isolating the secondary operating system has been altered;

denying the request to initiate the secondary operating system and preventing the initiation of the primary operating system if the partition isolating the secondary operating system has been altered;

upon determining that the partition isolating the secondary operating system has been altered, recording, by the reporting program, information regarding the altering of the partition to a remote server within a predetermined period of time defined by a connectivity timer, the verification module is configured to deny the request to initiate the secondary operating system and preventing the initiation of the primary operating system;

the connectivity timer being configured to:

Determine whether a connection over a network has been established between the reporting program and the remote server within a predetermined period of time; and Upon determining that the connection over the network has not been established between the reporting program and the remote server within the predetermined period of time, the verification module is configured to disable at least one function of the computing device.

11. The computer system of claim 10, wherein the verification module is further configured to initiate the secondary operating system if the partition isolating the secondary operating system has not been altered.

12. The computer system of claim 11, wherein the verification module is further configured to initiate the primary operating system if the partition isolating the secondary operating system has not been altered.

13. The computer system of claim 12, further comprising a virtualized network interface card (NIC) configured to establish a connection with a server.

14. The computer system of claim 13, wherein the reporting program is configured to send data associated with the identification of the computer system to the server.

15. The computer system of claim 13, wherein the reporting program is further configured to send data associated with the activity of a user of the computer system to the server.

16. The computer system of claim 13, wherein the reporting program is further configured to receive one or more security commands from the server, wherein the one or more security commands comprise a command to terminate the initiation of the primary operating system.

17. A computer-program product to securing data and hardware associated with a computing device, the computer-program product comprising a non-transitory computer-readable medium having instructions thereon, the instructions comprising:

Code programmed to execute a reporting program;

code programmed to receive a request to initiate a secondary operating system, wherein the secondary operating system isolated from a primary operating system by a partition;

Code programmed to determine whether the partition isolating the secondary operating system has been altered;

upon determining that the partition isolating the secondary operating system has been altered, recording, by the reporting program, information regarding the altering of the partition to a remote server within a predetermined period of time defined by a connectivity timer, code programmed to deny the request to initiate the secondary operating system and prevent initiation of the primary operating system;

The connectivity timer to determine whether a connection over a network has been established between the reporting program executing on the computing device and the remote server within a predetermined period of time; and upon determining that the connection over the network has not been established between the reporting program and the remote server within the predetermined period of time, code programmed to disable at least one function of the computing device.

18. The computer-program product of claim 17, wherein the instructions further comprise code programmed to initiate the primary operating system and the secondary operating system if characteristics of the secondary operating system have not been altered.

* * * * *